(12) United States Patent
Shiimoto et al.

(10) Patent No.: US 8,848,317 B2
(45) Date of Patent: Sep. 30, 2014

(54) MAGNETIC DATA RECORDING SYSTEM WITH MIRROR IMAGE ASYMMETRIC MAGNETIC WRITE ELEMENTS

(71) Applicant: HGST Netherlands B.V., Amsterdam (NL)

(72) Inventors: Masato Shiimoto, Odawara (JP); Ikuya Tagawa, Hiratsuka (JP); Yasutaka Nishida, Fujisawa (JP); Hiroyuki Katada, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/725,593

(22) Filed: Dec. 21, 2012

(65) Prior Publication Data
US 2014/0177105 A1 Jun. 26, 2014

(51) Int. Cl.
*G11B 5/187* (2006.01)
*G11B 5/105* (2006.01)
*G11B 5/23* (2006.01)

(52) U.S. Cl.
CPC ..................................... *G11B 5/105* (2013.01)
USPC .................... 360/125.3; 360/122; 360/119.01

(58) Field of Classification Search
CPC .......... G11B 5/012; G11B 5/315; G11B 5/11; G11B 5/187; G11B 5/23; G11B 2005/0024
USPC .................. 360/319, 125.3, 128, 122, 119.01
See application file for complete search history.

(56) References Cited

U.S. PATENT DOCUMENTS

| | | | |
|---|---|---|---|
| 5,650,893 A * | 7/1997 | Bolasna et al. | 360/236.1 |
| 5,799,388 A | 9/1998 | Shouji | |
| 6,563,674 B1 * | 5/2003 | Honda | 360/234.5 |
| 8,139,322 B2 | 3/2012 | Yamada et al. | |
| 8,223,458 B2 * | 7/2012 | Mochizuki et al. | 360/125.1 |
| 8,339,734 B2 * | 12/2012 | Pentek et al. | 360/119.03 |
| 2007/0206323 A1 | 9/2007 | Im et al. | |
| 2009/0002896 A1 * | 1/2009 | Mallary et al. | 360/319 |
| 2009/0251821 A1 | 10/2009 | Song et al. | |
| 2011/0085266 A1 | 4/2011 | Kanai et al. | |
| 2011/0242707 A1 | 10/2011 | Yoon et al. | |
| 2012/0147502 A1 | 6/2012 | Udo et al. | |
| 2013/0016443 A1 * | 1/2013 | de La Fuente et al. | 360/123.12 |

OTHER PUBLICATIONS

Feng, J. S., "Effects of uniform magnetic fields on shielded MR sensors," Nov. 1991, IEEE Transactions on Magnetics, vol. 27, No. 6, pp. 4701-4703, abstract only.

Tagawa et al., "Minimization of erase-band in shingled PMR with asymmetric writer," Feb. 2012, Journal of Magnetism and Magnetic Materials, vol. 324, No. 3, pp. 327-329, abstract only.

\* cited by examiner

*Primary Examiner* — Will J Klimowicz
(74) *Attorney, Agent, or Firm* — Zilka-Kotab, PC (57) ABSTRACT

A magnetic disk drive system configured for shingled magnetic data recording wherein data tracks are recorded in an overlapping fashion on a magnetic media. The disk drive system includes magnetic write heads that are asymmetric so as to have increased writing at one side of the write head. The magnetic disk drive system includes magnetic write heads that are mirror images of one another so that write heads located at opposite surfaces of the magnetic media (e.g. one head facing up and one facing down) end up having preferential writing in the location relative to inner and outer diameters of the magnetic media.

15 Claims, 13 Drawing Sheets

MAGNETIC DATA RECORDING SYSTEM WITH MIRROR IMAGE ASYMMETRIC MAGNETIC WRITE ELEMENTS

FIELD OF THE INVENTION

The present invention relates to magnetic data recording and more particularly to a magnetic data recording system using asymmetric magnetic write heads for shingled magnetic recording.

BACKGROUND OF THE INVENTION

A component of many computers and data server systems is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil is wrapped around the write pole and induces a magnetic flux that magnetizes the write pole when a current is passed through the coil. This results in a magnetic write field being, generated through the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data. The polarity of the write field is dictated by the polarity of the write current through the write coil. The polarity is switched based on a write clock whose frequency and phase are controlled to optimize the data write process.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

In order to increase data density it is necessary to increase the track pitch, which means reducing the spacing, between data tracks. However, the spacing between data tracks has been limited by the size of the write pole of the write head. The amount by which the Write pole size can be reduced is limited by the need to provide sufficient magnetic write field to reliably write a hit of data to the magnetic media. One way to overcome this is to record data in a shingled fashion, wherein data tracks overlap one another. In such a system only the inner or out edge (depending on design) of the each of the data tracks is read. Such a system has shown promise for increasing data density, but has also presented challenges with regard to design, implementation and performance.

SUMMARY OF THE INVENTION

The present invention provides a magnetic disk drive that includes a magnetic media having a first and a second opposite surfaces. A first slider is arranged adjacent to the first surface of the magnetic media and has a first write head formed thereon, and a second slider is arranged adjacent to the second surface of the magnetic media and has a second write head formed thereon. The first and second magnetic write heads are each asymmetrical and are mirror images of one another.

The disk drive can be configured for shingled magnetic recording, and the asymmetrical structure of the write head allows the write head to predominantly write to a desired side of the write pole in order to facilitate the shingled magnetic recording. In addition, the disk drive system has multiple write heads with some being mirror image of the others such that a downward facing head that is configured to write to one side of the media is a mirror image of an upward facing magnetic write head at an opposite side of the media. Because the write heads are mirror images and are also facing in opposite directions, each has a preferred side of writing that is arranged in the same orientation relative to the inner or outer diameter of the magnetic media. In this way, recording can be performed in a manner (either starting at the inner diameter and working outward or starting at the outer diameter and working inward) for both the upward and downward facing write head. This advantageously improves the speed and performance of the disk drive system.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating, the general principles of this invention and is not meant to limit the inventive concepts claimed herein.

Figure 1:
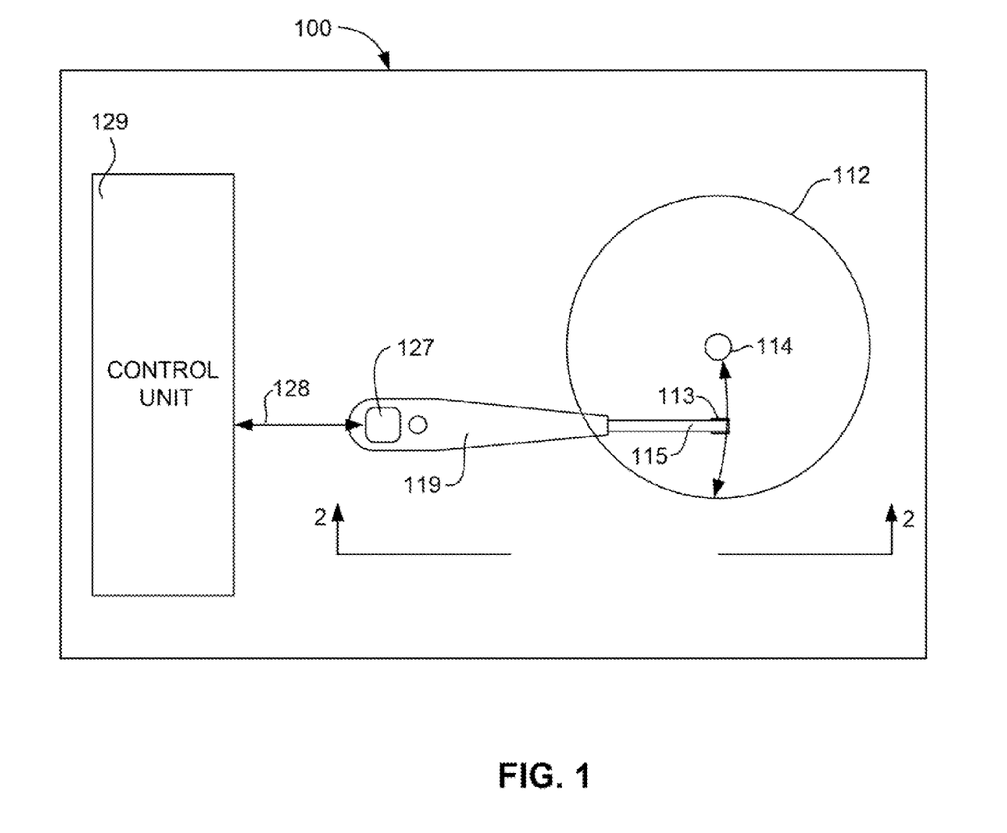
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle. The magnetic recording on each disk is in the form of annular patterns of concentric data tracks (not: shown) on the magnetic disk 112.

A plurality of sliders 113, each having a magnetic head formed on its trailing edge, are positioned near a magnetic disk 112. As the magnetic disk rotates, slider 113 moves radially in and out over the surface of the disk 112 so that the magnetic head assembly of the slider 113 can access different tracks of the magnetic disk where desired data are written and read. Each slider 113 is attached to an actuator arm 119 by way of a suspension 115. The suspension 115 provides a slight spring force which biases slider 113 against the disk surface 112. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the surface of the disk 112 which exerts an upward force or lift on the slider. The air bearing thus counterbalances the slight spring force of suspension 115 and supports slider 113 off and slightly above the surface of the disk 112 by a small, substantially constant spacing during normal operation.

The various components of the disk storage system are controlled in operation by control signals generated by control unit 129. Typically, the control unit 129 comprises a system interface, data storage cache, microprocessor, and subsystem electronics. The control unit 129 generates control signals to control various system operations such as head position and seek control signals on line 128. The control signals on line 128 provide the desired current: profiles to optimally move and position slider 113 to the desired data track on disk 112. In addition, the control unit houses electronics for sensing and processing, signals from the read head, as well as controlling currents for the write head.

Figure 2:
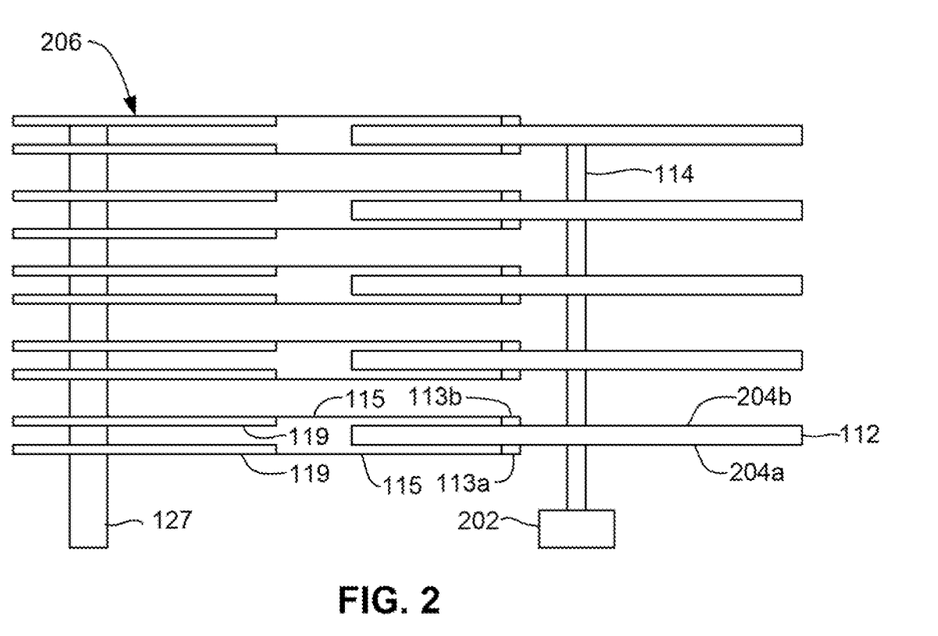
FIG. 2 is a side schematic view as seen from line 2-2 of FIG. 1.

FIG. 2 shows a side view of a portion of the disk drive system as seen from line 2-2 of FIG. 1. As shown in FIG. 2, the disk drive system includes a stack of several magnetic disks 112 each of which are held on a spindle 114, which can be attached to a motor 202 for rotating the disks 112. Each of the disks has a bottom surface 204a and an upper surface 204b. The system also includes a spindle assembly 206 formed as a stack of actuator arms 119, suspensions 115 and sliders 113 some of which are configured to record to a bottom surface 204a of a disk 112 and some of which are configured to record to an upper surface 20413 of a disk 112. Also, as can be seen in FIG. 2, some of the sliders are upward facing sliders 113a configured to read a bottom surface 204a of the magnetic disk 112. Whereas other of the sliders are configured as downward facing sliders 113b configured to read a top surface 204b.

Figure 3:
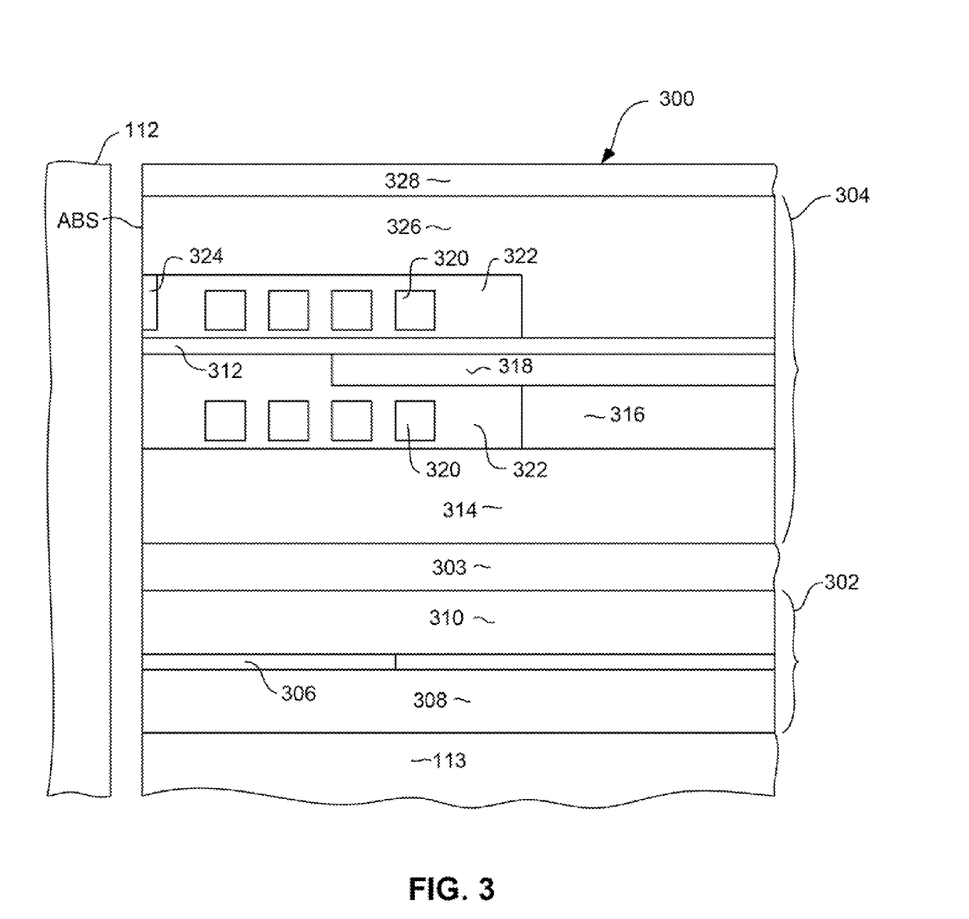
FIG. 3 is side cross sectional view of a magnetic head.

FIG. 3 shows a side cross sectional view of a magnetic head 300 that can be formed on a slider for writing data to a magnetic disk 112 or reading data from the magnetic disk 112. The magnetic head 300 includes a read element 302 and a write element 304, which may be separated from one another by a non-magnetic, electrically insulating layer 303 such as alumina. The read element can include a magnetoresistive sensor 306 such as a giant magnetoresistive sensor (GMR) or tunnel junction sensor (TMR). The read sensor 306 is sandwiched between first and second magnetic shields 308, 310.

The write element includes a write pole 312 that extends to an air bearing surface ABS, and a magnetic return pole 314 that has a larger cross section at the ABS than the write pole. The write pole 312 and return pole 314 can be magnetically connected with one another in a region removed from the ABS by a magnetic back gap layer 316 and a shaping layer 318. The shaping layer 318 (also referred to as a stitched pole) help to channel magnetic flux to the tip of the write pole 312. One or more electrically conductive non-magnetic write coils 320 (shown in cross section in FIG. 3) pass between the write pole 312 and return pole 314, and can be embedded in a non-magnetic, electrically insulating fill layer 322 such as alumina and/or hard baked photoresist.

The write element 304 can also include a trailing magnetic shield 324, that may also be formed to wrap around the sides of the write pole 312 (as will be seen herein below). The trailing magnetic shield 324 helps to increase write field gradient to improve magnetic recording. The trailing magnetic shield 324 can be connected with a trailing return pole 326 that is also magnetically connected with the other magnetic structures of the write element 304 at a back location removed from the ABS. A non-magnetic, electrically insulating protective layer 328 can be formed over the write element 304 to protect the read and write elements 302.

Figure 4:
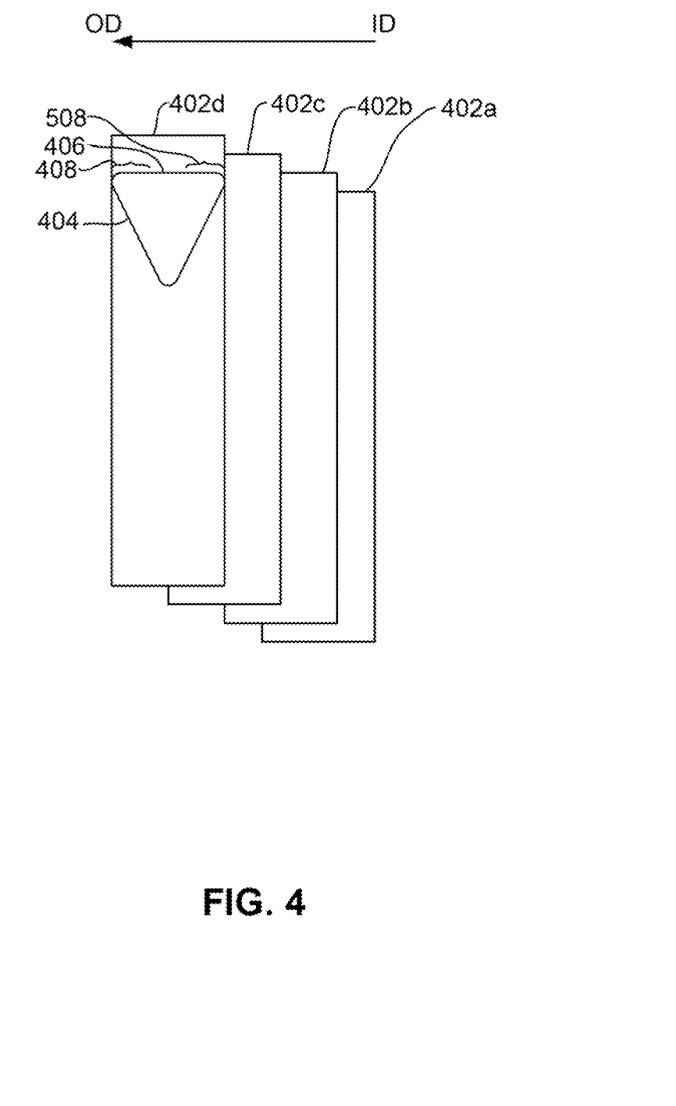
FIGS. 4 and 5 are schematic illustrations of shingled magnetic recording.
Figure 5:
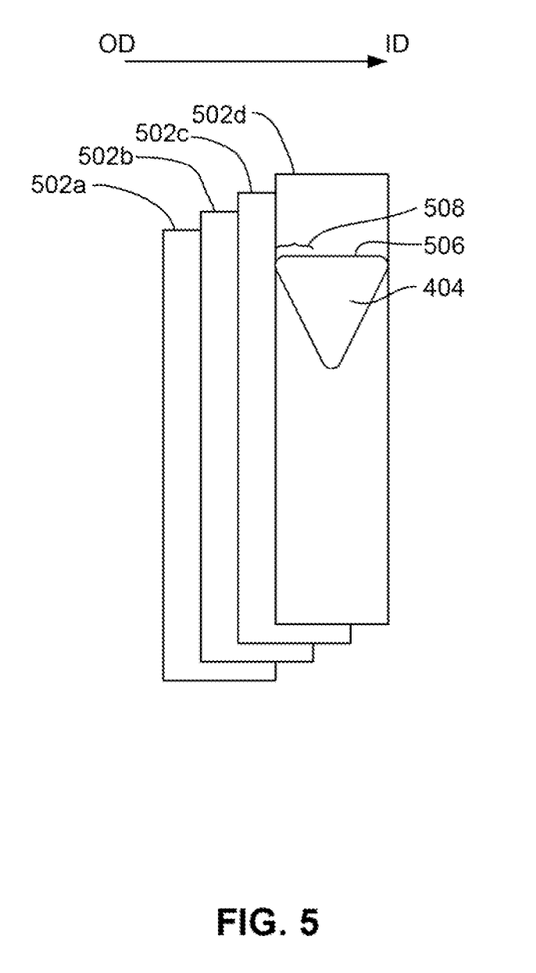

FIGS. 4 and 5 show schematically how data can be recorded onto a magnetic disk using shingled magnetic recording. As discussed above, there is a demand for increased track density correlating to track pitch, in order to increase data density. One way to increase the track density would be to make the write pole 312 smaller (as viewed from the ABS). However, the size of the write pole 312 can only be reduced so much, since reducing the size of the write pole also reduces the amount of magnetic write field that can be produced by the write element 304.

A solution to this is to overlap the data tracks, as shown in FIGS. 4 and 5. This type of recording can be referred to as "shingled" recording, because the overlapping data tracks can be conceptualized as resembling shingles of a roof. A plurality of such overlapping "shingled" data tracks 402a through 402d are shown in FIG. 4. The triangular shape 404 represents a magnetic footprint of magnetization produced by a magnetic write pole. The magnetic footprint 402 has a triangular or trapezoidal) shape, because the tip of the write has such as shape to avoid issues related to skew.

In a traditional magnetic data recording system the entire trailing edge 406 of the footprint (corresponding to the location of a trailing edge of a write pole) determines writing. However, in a shingled recording system, only one lateral outer edge portion of the trailing edge 406 determines the final written signal. In the recording shown in FIG. 4, the recording is performed from an inner diameter (ID) of the disk and progresses toward the outer diameter (OD) of the disk. In this case ten, it is the innermost portion 508 (relative to the disk diameter) of the trailing edge 406 that determines the writing that will be readable later.

On the other hand, shingled writing could progress from the outer diameter (OD) to the inner diameter (ID) as shown in FIG. 5. FIG. 5 shows a plurality of overlapping data tracks 502a-502d, and the writing is initiated at the outer diameter and progresses inwardly. In this case, the outermost edge 508 of the trailing edge 506 of the write bubble 504 is primarily responsible for the data that will be written to the media.

It can be seen, then, that writing performance can be improved in a shingled recording system by improving writing at an outer edge of a trailing edge of a write pole. In order for this benefit to be realized, however, the correct outer edge should be configured as the primary recording edge, depending upon the manner in which the shingled recording is performed.

Figure 6:
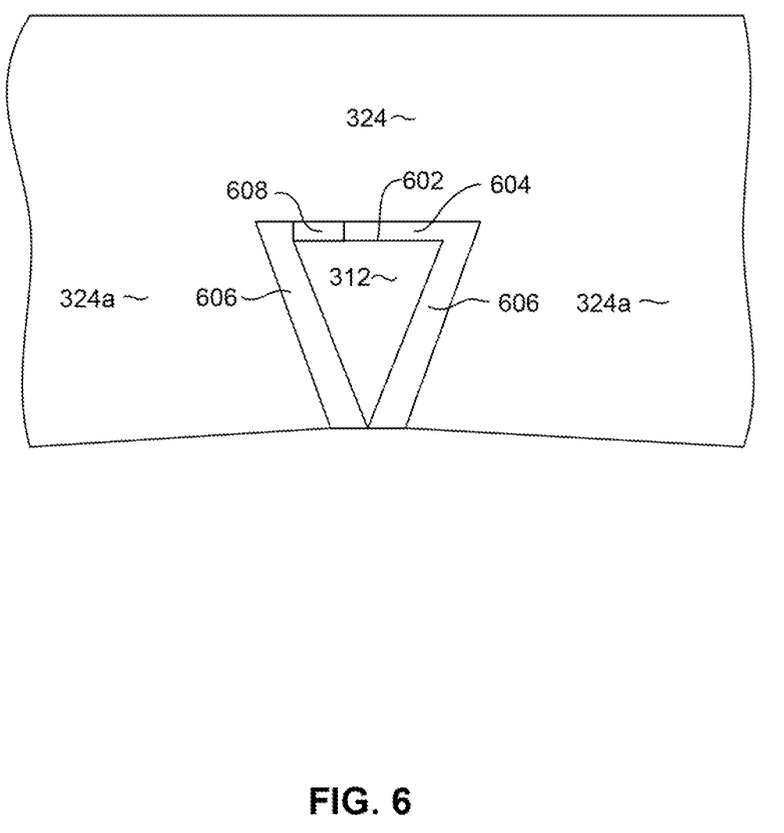
FIG. 6 is an air bearing surface view of a portion of a magnetic write head according to an embodiment of the invention.

FIG. 6 shows an air bearing surface view (ABS view) a magnetic write pole 312 of an asymmetrical write element 304 (FIG. 3) according to an embodiment of the invention. The write pole 312 is shown having a triangular shape, but could also have a trapezoidal shape. The write pole 312 has a trailing edge 602 that is separated from the trailing shield by a non-magnetic trailing gap layer 604. The trailing magnetic shield 324 can be formed to wrap around the sides of the write pole 312 to provide side shield portions 324a that are separated from the sides of the write pole 312 by non-magnetic, electrically insulating side-gap layers 606.

A magnetic microwave generator 608 is formed at the trailing edge 602 of the write pole 312 between the trailing edge 602 of the write pole 312 and the trailing shield 324. The magnetic microwave generator 608 is a device that produces an oscillating or alternating magnetic field. One type of device that can produce such an oscillating magnetic field is a spin-torque oscillator. The oscillating magnetic field produced by such a magnetic microwave generator 608 facilitates writing to the magnetic medium by setting up a magnetic oscillation within the magnetic medium. In FIG. 6 it can be seen, however, that the magnetic microwave generator 608 is located at one lateral outer edge portion of the trailing edge 602 of the magnetic write pole 312, in this way, the magnetic microwave generator 608 can assist magnetic writing at a desired outer edge most appropriate for shingled magnetic data recording as discussed above with reference to FIGS. 4 and 5. The choice of which outer location of the trailing edge should include the magnetic microwave generator depends upon whether the shingled magnetic recording is being performed to progress from the inner diameter to the outer diameter as discussed with reference to FIG. 4 or whether it is being performed so as to progress from the outer diameter to the inner diameter as described with reference to FIG. 5.

Figure 7:
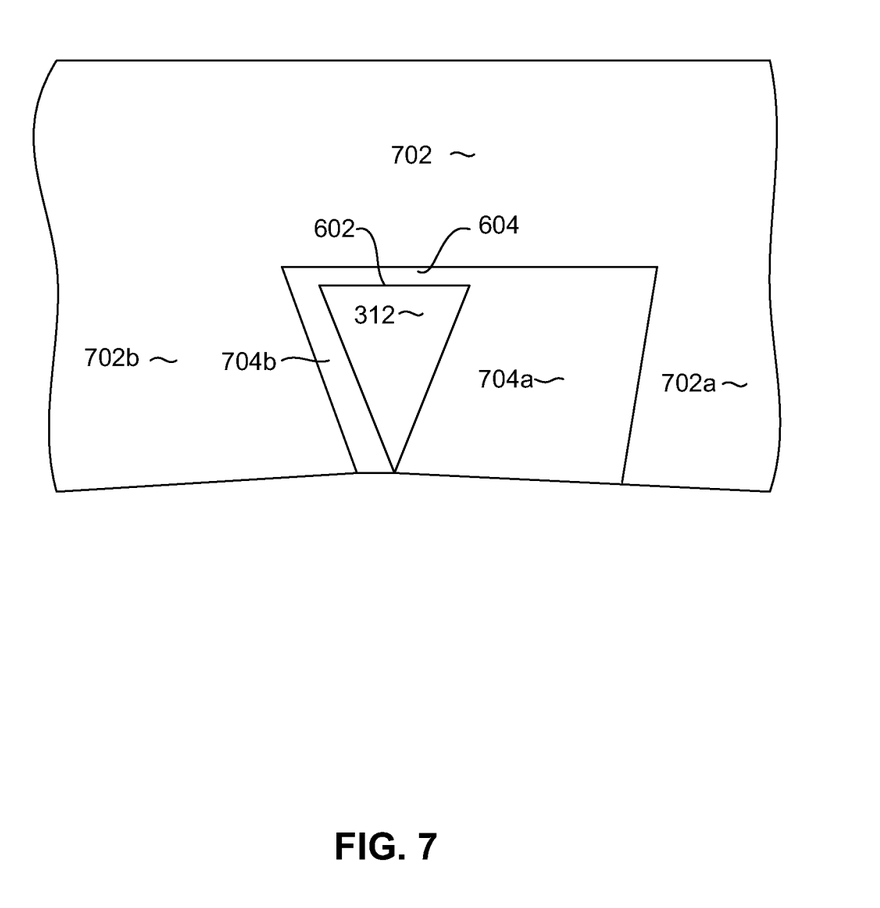
FIG. 7 is an air bearing surface view of a portion of a magnetic write head according to an alternate embodiment of the invention.

FIG. 7 illustrates an asymmetrical write head according to another possible embodiment of the invention, as seen in FIG. 7, the write pole 312 has a trailing edge 602 as before, which is separated from a trailing magnetic shield 702 by a non-magnetic trailing gap 604. However, the embodiment shown in FIG. 7 has asymmetrical side shielding, including a side shield portion 702a that is separated from the write pole 312 by distance that is significantly greater than the distance by which the other side shield portion 702b is separated from the write pole. The side shield portion 702a is separated from the side of the write pole by a first side gap 704a and the second side shield portion 702b is separated from the side of the write pole by a second side gap layer 704b, where the side gap 704a is significantly thicker than the side gap 704b. The difference in side shield spacing creates an asymmetrical writing, wherein writing is facilitated at the side of the write pole that has the closer side shield (e.g. the side adjacent to 702b in FIG. 7). The closer side shield increases the side field gradient which promotes magnetic switching during writing.

Figure 8:
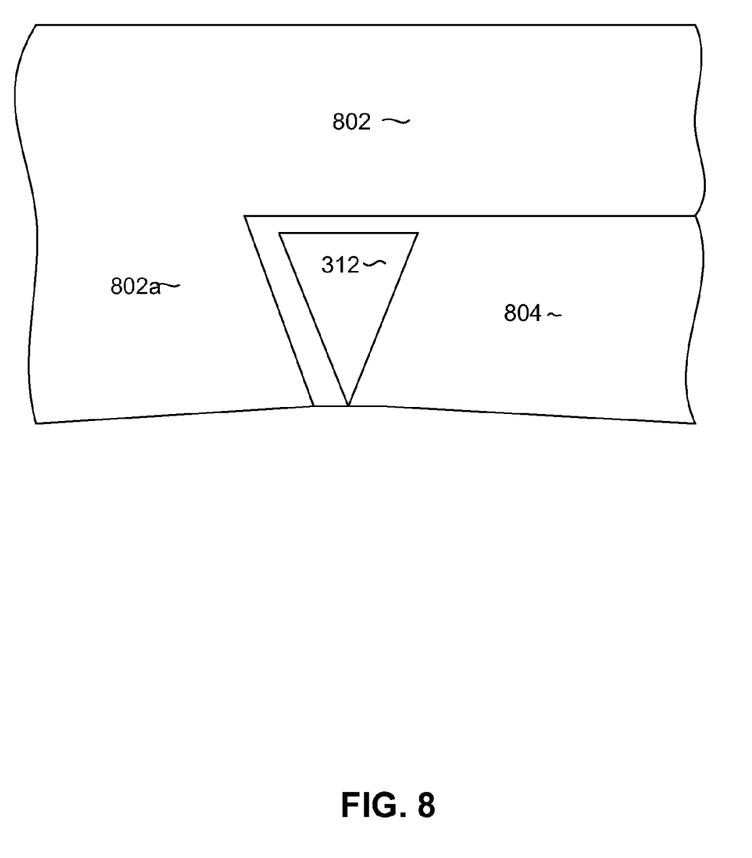
FIG. 8 is an air bearing surface view of a portion of a magnetic write head according to yet another embodiment of the invention.

FIG. 8 shows an asymmetrical write head according to yet another embodiment of the invention. FIG. 8 shows a write head having a write pole 312 with a trailing shield 802 that wraps around the write pole at only one side to provide a side shield portion 802a at only one side of the write pole and not at the other and non-magnetic material 804 at the other side. Similar to the above described embodiment, the presence of the side shield 802a promotes writing at the side at the side at which it is present by increasing the side field gradient at that side.

Sliders having, magnetic heads formed thereon, are formed on a wafer with many thousands of such sliders being formed on a single wafer. With reference back to FIG. 2, the sliders 113a used to read a bottom surface 204a of a media disk 112 have been the same as the sliders 113h used to read an upper surface 204b of the disk 112. However, when using an asymmetrical write head as describe above, the use of the same write head on both up and down sliders raises a concern that can be better understood with reference to FIG. 9.

Figure 9:
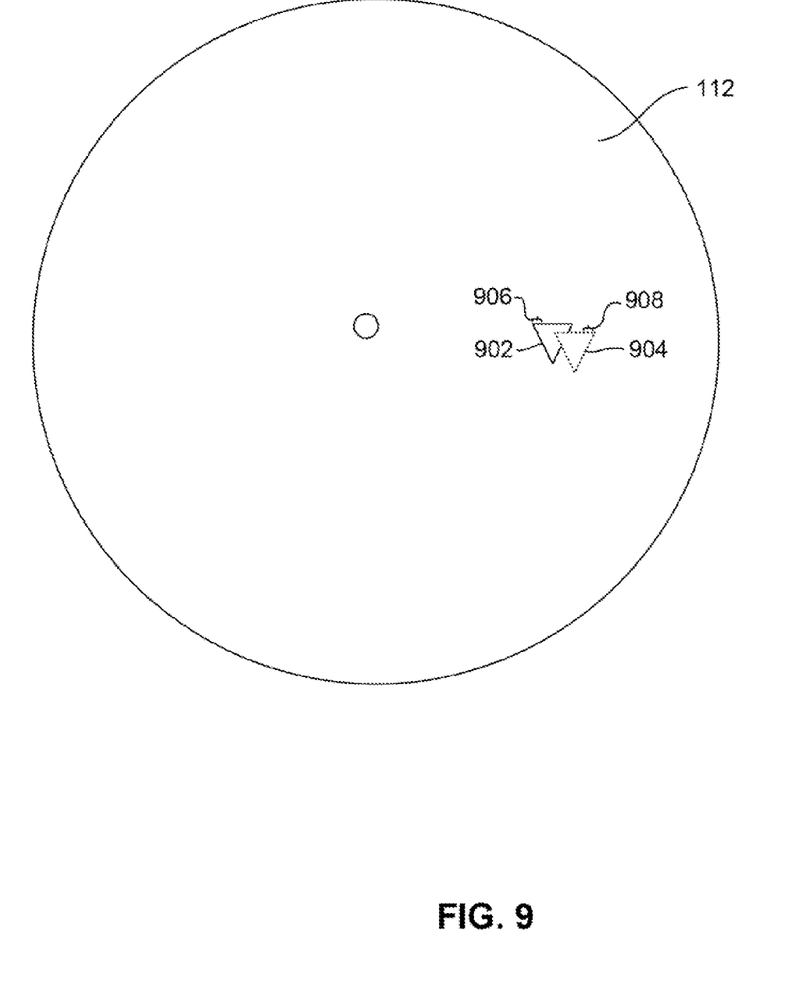
FIG. 9 is a view illustrating an orientation of up and down magnetic heads relative to a magnetic disk.

FIG. 9 shows a magnetic disk 112. Triangle 902 represents the orientation of slider located above the disk and facing downward. The dotted triangle 904 represents a write head located below the disk 112 and facing upward toward the disk. The write head 902 is an asymmetrical write head configured such that writing is disproportionately performed at one side edge location 906. However, since the heads 902, 904 are identical, the write head 904 (which is flipped upside down relative to the head 902) has its preferred writing edge location 908 located at an opposite side. That is to say, while the head 902 has its preferred edge 906 located toward the inner diameter of the disk, the other head 904 has its preferred edge 908 located at the outer diameter of the disk. In order to function in a shingled recording system therefore, the head 902 must record from the inner diameter working outward, while the head 904 must record from the outer diameter working inward. This would result in severe performance issues, slowing the speed of the disk drive system by requiring excessive movement of the actuator that controls the location of the sliders over the disk 112.

Figure 10:
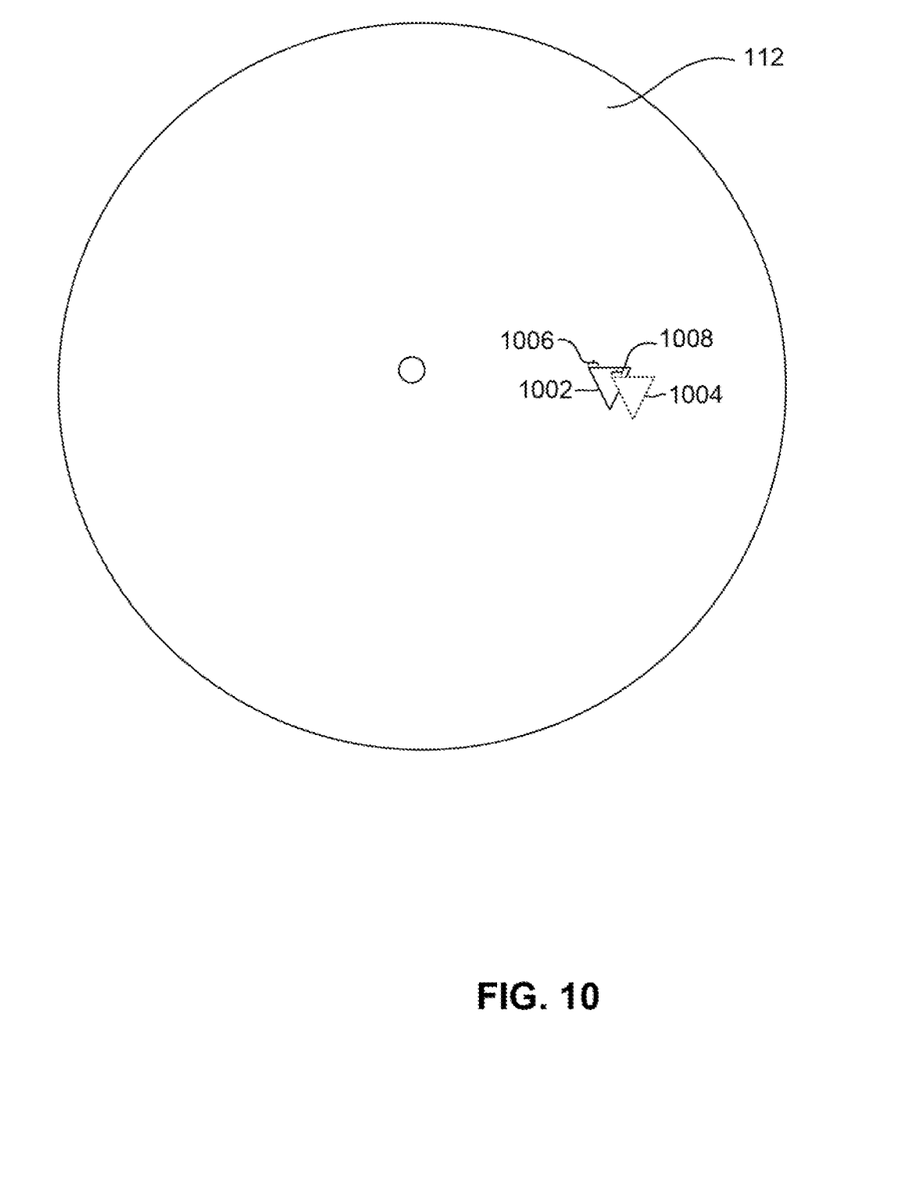
FIG. 10 is a view similar to that of FIG. 9, but using, mirror image magnetic write heads.

FIG. 10 illustrates a solution to this problem. FIG. 10 shows a magnetic disk 112 having write heads 1002, 1004 that are constructed as mirror images of one another. In other words, one write head 1002 has its preferred writing edge 1006 on one side and the other 1004 has its preferred writing edge 1008 on the other. In this way, when the write elements 1002, 1004 are facing in opposite directions with one up and one down, the preferred writing edges 1006, 1008 are oriented in the same direction relative to the disk, either both toward the inner diameter (as shown) or both toward the outer diameter.

Figure 11:
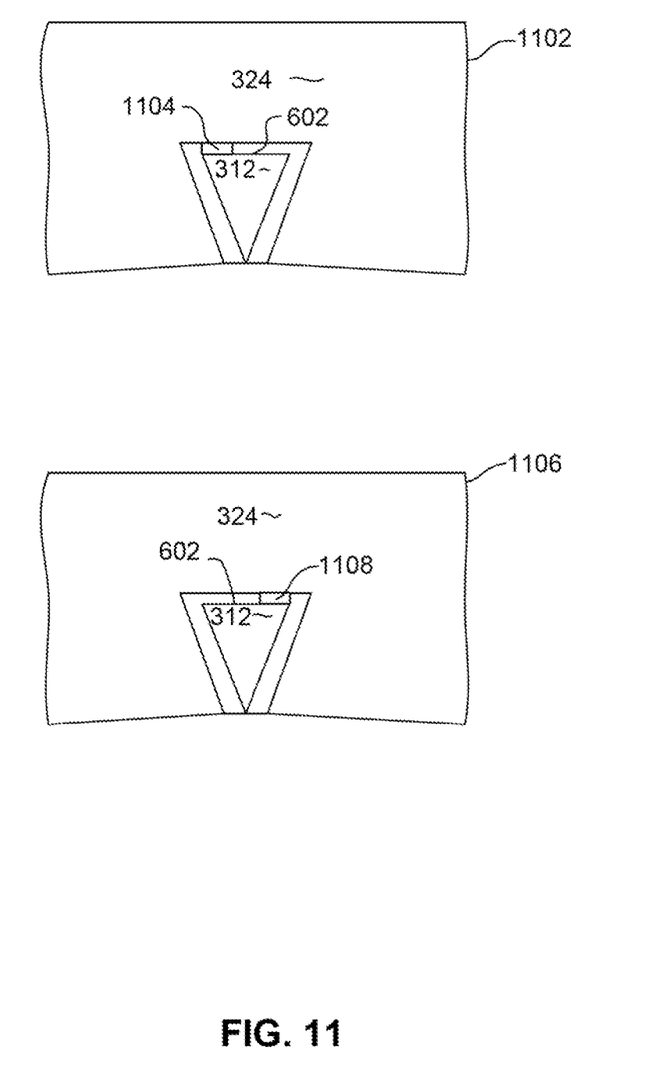
FIG. 11 is an air bearing surface view of a portion of two mirror image asymmetrical write heads.

FIG. 11 shows an example of this in an embodiment using a magnetic microwave generator element. In FIG. 11, a first magnetic head 1102 has a write pole 312 and trailing shield 324 and has a magnetic microwave generator 1104 located at a first outer edge of the trailing edge 602 (e.g. toward the left side) and another magnetic head 1106 has a write pole 312 and trailing shield 324 with a magnetic microwave generator 1108 located at the opposite outer edge of the trailing edge (e.g. at the right side). This embodiment provides a magnetic microwave assisted recording system that can assist writing at the same side location in a shingled recording system with one write element (e.g. 1102) being used as an "up" head and the other write element (e.g. 1106) being used as a "down" head.

Figure 12:
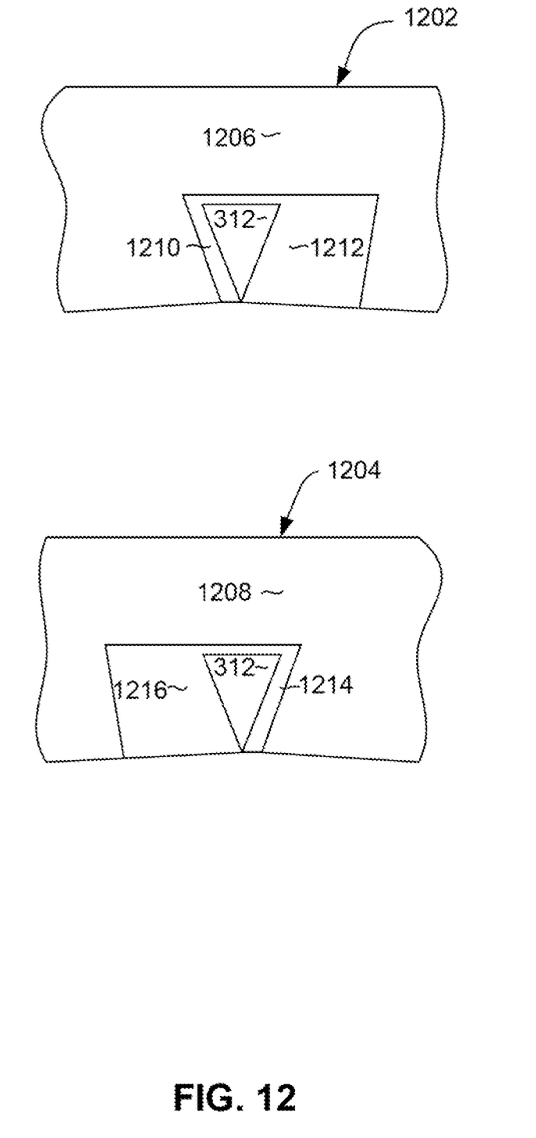
FIG. 12 is an air bearing surface view of a portion of two mirror image asymmetrical write heads according to an alternate embodiment of the invention.

Similarly. FIG. 12 shows two mirror image write heads 1202, 1204 having asymmetrical wrap around trailing shield structure 1206, 1208. More specifically, the write head 1202 has a side shield with a smaller side gap 1210 on the left and a significantly larger side gap 1212 on the right. Conversely, the write head 1204 has a smaller side gap 1214 on the right and a significantly larger side gap 1216 on the left. As discussed above, for each head 1202, 1204 the side with the smaller side gap will have an improved writing due to the increased side field, gradient. Therefore, when these two mirror image write heads 1202, 1204 are placed at opposite surfaces (e.g. top and bottom) of the magnetic disk, they will have preferred writing edges located at the same location (e.g. inner edge or outer edge) for improved shingled writing.

Figure 13:
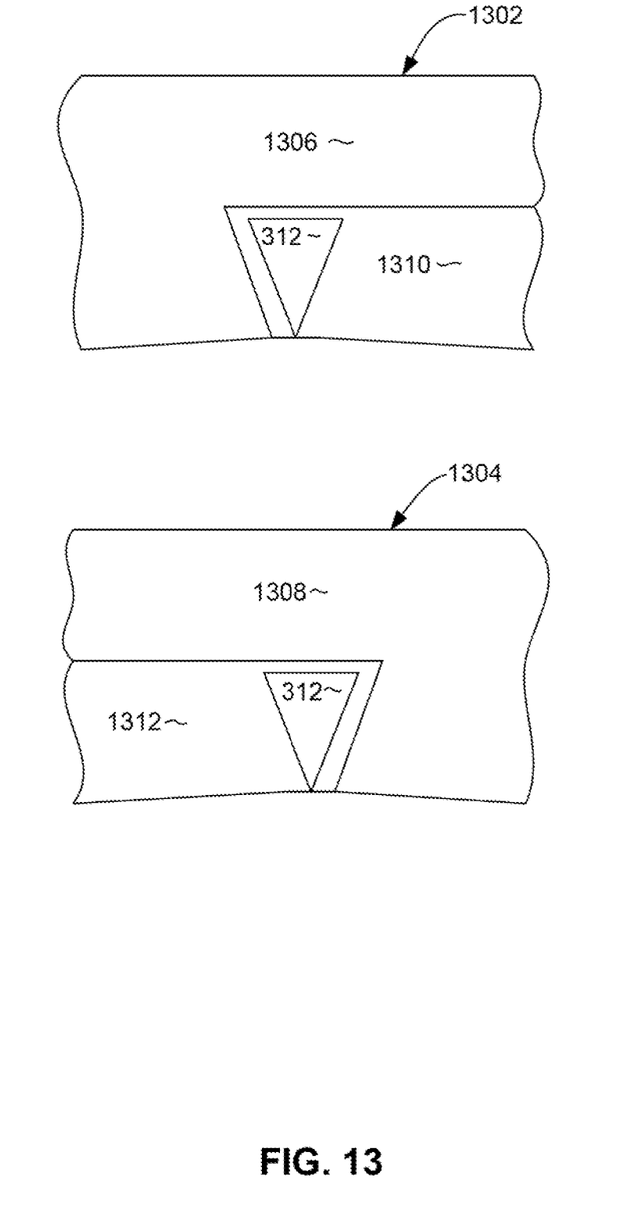
FIG. 13 is an air bearing, surface view of a portion of two mirror image asymmetrical write heads according to another embodiment of the invention.

In much the same fashion, FIG. 13 shows two magnetic heads 1302, 1304 that each have shield structures 1306, 1308 that are mirror images of each other. The head 1302 has a shield that provides side shielding only on the left and only has non-magnetic material 1310 on the right. Conversely, the write head 1304 has a shield structure 1308 that provides shielding only on the right, and has only non-magnetic material 1312 on the left. Again, when these two heads are located at opposite sides of the magnetic disk, their preferred writing edges (the side with the shielding) will be in the same location relative to the inner or outer diameters of the disk.

While various embodiments have been described, it should be understood that they have been presented by way of example only, and not limitation. Other embodiments falling within the scope of the invention may also become apparent to those skilled in the art. Thus, the breadth and scope of the invention should not be limited by an of the above-described exemplary embodiments, but should be defined only in accordance with the following claims and their equivalents.

What is claimed is:

1. A magnetic disk drive, comprising:
   a magnetic media having first and second opposite surfaces;
   a first slider arranged adjacent to the first surface of the magnetic media having a first magnetic write head formed thereon; and
   a second slider arranged adjacent to the second surface of the magnetic media and having a second magnetic write head formed thereon; wherein
   the first and second magnetic write heads each have a magnetic write pole and are each configured to produce a magnetic write field that is laterally asymmetrical relative to the magnetic write pole and are mirror images of one another.

2. The magnetic disk drive as in claim 1, wherein each of the first and second magnetic write heads includes the magnetic write pole having first and second laterally opposed sides and a trailing edge extending from the first side to the second side, the magnetic write head further comprising:
   a first magnetic microwave generator located at a left side of the trailing edge of the write pole of the first magnetic write head; and
   a second magnetic microwave generator located at a right side of the trailing edge of the write pole of the second magnetic write head.

3. The magnetic disk drive as in claim 2, wherein each of the first and second magnetic microwave generators is a spin torque oscillator.

4. The magnetic disk drive as in claim 2, wherein each of the first and second magnetic write heads further comprises a trailing magnetic shield, each arranged so that the magnetic microwave generator is located between the trailing edge of the write pole and the trailing magnetic shield.

5. The magnetic disk drive as in claim 1, wherein:
   the first magnetic write head comprises a magnetic write pole having a left side and a right side, a left side shield separated from the left side of the write pole by a non-magnetic left side gap layer and a magnetic right side shield separated from the right side of the write pole by a non-magnetic right side gap layer, the left side gap layer being thicker than the right side gap layer; and
   the second magnetic write head comprises a magnetic write pole having a left side and a right side, a left side shield separated from the left side of the write pole by a non-magnetic left side gap layer and a magnetic right side shield separated from the right side of the write pole by a non-magnetic right side gap layer, the right side gap layer being thicker than the left side gap layer.

6. The magnetic disk drive as in claim 5, further comprising a trailing magnetic shield, wherein the trailing magnetic shield and first and second side shields of each magnetic write head form a wrap-around magnetic shield structure.

7. The magnetic disk drive as in claim 1, wherein:
   the first magnetic write head includes a magnetic write pole and a magnetic side shield at only a right side of the write pole; and
   the second magnetic write head includes a magnetic write pole and a magnetic side shield at only a left side of the write pole.

8. The magnetic disk drive as in claim 7, wherein the magnetic write head further includes a magnetic trailing shield that is magnetically connected with the magnetic side shield of each magnetic write head.

9. The magnetic disk drive as in claim 1, wherein the first and second magnetic write heads each have the magnetic write pole and wherein the asymmetry of the magnetic write heads causes first magnetic write head to write predominantly at a first lateral edge of its write pole and the second magnetic write head to write predominantly at a second lateral edge of its write pole with the orientation of the first lateral edge being opposite to the orientation of the second lateral edge.

10. The magnetic disk drive as in claim 1, wherein the magnetic media has an inner diameter and wherein the asymmetry of the magnetic write heads causes each of the magnetic write heads to have a preferred writing edge located toward the inner diameter of the magnetic media.

11. The magnetic disk drive as in claim 1, wherein the magnetic media has an outer diameter and wherein the asymmetry of the magnetic write heads causes each of the magnetic write heads to have a preferred writing edge located toward the outer diameter of the magnetic media.

12. The magnetic disk drive as in claim 1, wherein each of the magnetic write heads includes the magnetic write pole having a trailing edge, and wherein the magnetic write heads are asymmetric to one another and mirror images of one another about a line that is perpendicular to the trailing edge of the write pole.

13. The magnetic disk drive as in claim 1, wherein each of the magnetic write heads has a write pole and is configured to provide increased write field gradient toward an inner edge of the write pole relative to an inner diameter of the magnetic media.

14. The magnetic disk drive as in claim 1 wherein each of the magnetic write heads has a write pole and is configured to provide increased write field gradient toward an outer edge of the write pole relative to an outer diameter of the magnetic media.

15. The magnetic disk drive as in claim 1, wherein the magnetic disk drive is configured for shingled magnetic recording.

* * * * *

UNITED STATES PATENT AND TRADEMARK OFFICE
CERTIFICATE OF CORRECTION

| | | |
|---|---|---|
| PATENT NO. | : 8,848,317 B2 | Page 1 of 1 |
| APPLICATION NO. | : 13/725593 | |
| DATED | : September 30, 2014 | |
| INVENTOR(S) | : Masato Shiimoto et al. | |

It is certified that error appears in the above-identified patent and that said Letters Patent is hereby corrected as shown below:

In the Specification:

Column 2, line 1 replace "the Write pole" with --the write pole--;

Column 2, line 3 replace "a hit of data" with --a bit of data--;

Column 7, line 41 replace "limited by an of the" with --limited by any of the--.

Signed and Sealed this
Fourteenth Day of July, 2015

Michelle K. Lee
*Director of the United States Patent and Trademark Office*